(12) United States Patent
Chuang et al.

(10) Patent No.: US 7,450,230 B2
(45) Date of Patent: Nov. 11, 2008

(54) MULTI-CHANNEL IMAGING SPECTROMETER

(75) Inventors: Kai-Ping Chuang, Pingtung County (TW); Fu-Shiang Yang, Hsinchu County (TW); Hau-Wei Wang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/833,312

(22) Filed: Aug. 3, 2007

(65) Prior Publication Data

US 2008/0144030 A1    Jun. 19, 2008

(30) Foreign Application Priority Data

Dec. 13, 2006    (TW) .............................. 95146598 A (51) Int. Cl.
*G01J 3/28*    (2006.01)
(52) U.S. Cl. ...................................... 356/328; 356/326
(58) Field of Classification Search ................. 356/326, 356/328
See application file for complete search history.

(56) References Cited

U.S. PATENT DOCUMENTS 5,297,555 A    3/1994    Martens
6,552,788 B1    4/2003    Castle
7,414,718 B2 *    8/2008    Wang et al. .................. 356/328
2005/0162649 A1 *    7/2005    Kryszczynski et al. ....... 356/328

FOREIGN PATENT DOCUMENTS

TW    1245114    12/2005

* cited by examiner

Primary Examiner—F. L Evans
(74) Attorney, Agent, or Firm—WPAT., P.C.; Justin King (57) ABSTRACT

A multi-channel imaging spectrometer, comprising an image acquiring unit, an optical detection element, a dispersion element and a lens module comprising a collimating lens module and a focusing lens module. The design of the lens module achieves elimination of primary aberrations such as coma and distortion through separating the collimating lens module and the focusing lens module, having identical structures with the collimating lens module, by a distance that is defined between a rear principle point of the collimating lens module and a front principle point of the focusing lens module and is twice of a front focal length of the focusing lens module. In addition, the lens module is also designed to exhibit linear dispersion for applied spectrum such that focus for each wavelength of the spectrum is linearly distributed on the imaging plane of the spectrometer so as to reduce the dispersion aberration.

20 Claims, 8 Drawing Sheets

MULTI-CHANNEL IMAGING SPECTROMETER

BACKGROUND OF THE INVENTION

1. Field of the Invention

The present invention generally relates to a spectrometer and, more particularly, to a multi-channel imaging spectrometer for eliminating primary aberrations in a conventional linear imaging spectrometer using the design of a lens module to improve the spectrum resolution and reduce the image distortion.

2. Description of the Prior Art

The conventional single-point spectrometer exhibits higher spectrum resolution but is not suitable for fast spectrum measuring on large-area samples because it takes plenty of time to perform two-dimensional shifting if two-dimensional spectrum information is required. An imaging spectrometer with a multi-channel field of view only requires one-dimensional linear shifting to complete two-dimensional spectrum measuring.

U.S. Pat. No. 5,297,555 discloses a multi-channel spectrometer with a linear field of view, using a single-slit as an object so that a light beam passes a collimating lens, a dispersion element (such as a grating or a prism) and a focusing lens to form an image on a planar detector.

Figure 1:
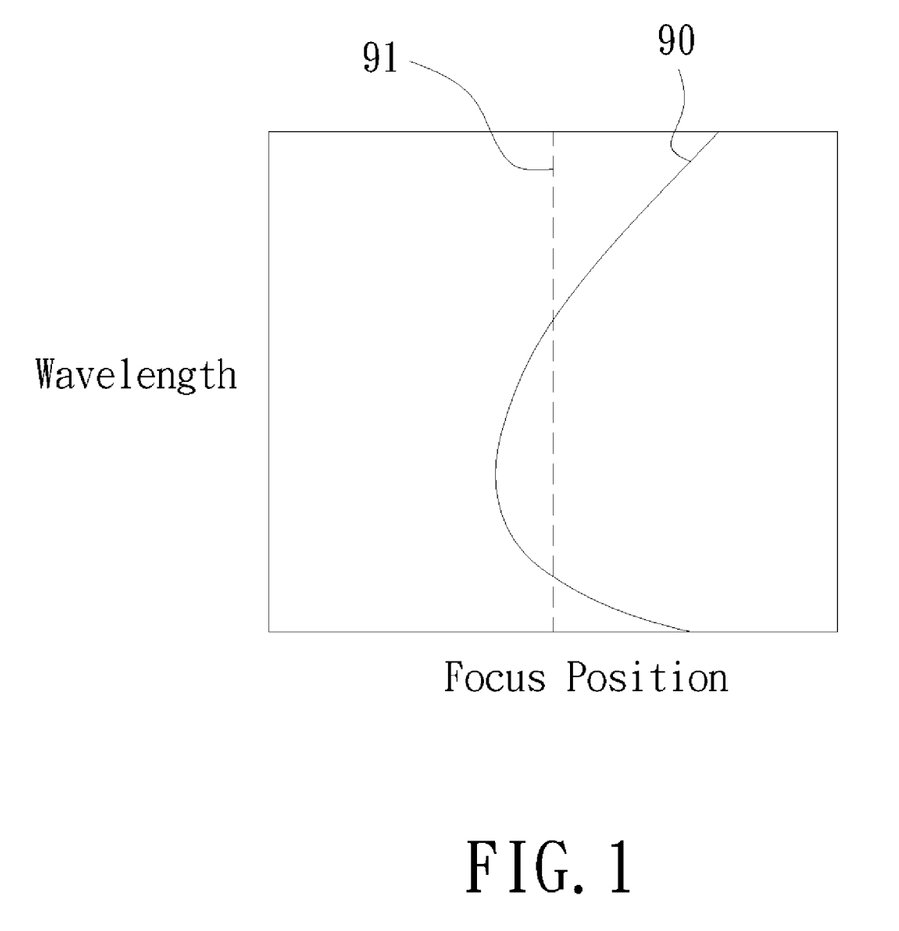
FIG. 1 shows chromatic dispersion of a conventional lens module according to the prior art.

Please refer to FIG. 1, which shows chromatic dispersion of a conventional lens module according to the prior art. The curve line 90 indicates the dispersion distribution for the conventional lens module, wherein the focus points for different wavelengths locate on a curve surface towards the axis. When the non-linear dispersion distribution is transformed by a planar detector (indicated by a dotted line 91) to form an image, the sizes of all the focus points for different wavelengths are non-identical to affect the spectrum resolution.

Taiwan Pat. Pub. No. I245114 discloses a spectrometer using a non-spherical lens as a collimating lens and an achromatic lens as a focusing lens. Moreover, U.S. Pat. No. 6,552,788 discloses a multi-channel spectrometer using linear dispersion distribution by the imaging lens so as to overcome conventional problems such as wedge or keystone shape arrangement of color imaging points.

Therefore, there is need in providing a multi-channel imaging spectrometer for eliminating primary aberrations to improve the spectrum resolution and reduce the image distortion.

SUMMARY OF THE INVENTION

It is one object of the present invention to provide a multi-channel imaging spectrometer for eliminating primary aberrations using the design of a lens module to improve the spectrum resolution.

It is another object of the present invention to provide a multi-channel imaging spectrometer using a design so that the dispersion distribution of the collimating lens module and the focusing lens module is linear and thus overcoming the problems such as poor and non-uniform spectrum resolution due to dispersion aberrations.

It is still another object of the present invention to provide a multi-channel imaging spectrometer characterized in that the collimating lens module and the focusing lens module are identical in lens structure and the distance between the rear principle point of the collimating lens module and the front principle point of the focusing lens module is twice of the front focal length of the focusing lens module so as to eliminate coma and distortion, reduce image bending on the imaging plane and improve the imaging quality.

In order to achieve the foregoing objects, the present invention provides a multi-channel imaging spectrometer, comprising: an image acquiring unit; an optical detection element, disposed on one side of the image acquiring unit; a dispersion element, disposed between the image acquiring unit and the optical detection element; and a lens module comprising a collimating lens module and a focusing lens module, wherein the collimating lens module is disposed between the image acquiring unit and the dispersion element, the focusing lens module is disposed between the dispersion element and the optical detection element, and a dispersion value of the lens module is linearly distributed so that focus points for different wavelengths locate on the optical detection element.

In order to achieve the foregoing object, the present invention further provides a multi-channel imaging spectrometer, comprising: an image acquiring unit; an optical detection element, disposed on one side of the image acquiring unit; a dispersion element, disposed between the image acquiring unit and the optical detection element; and a lens module comprising a collimating lens module and a focusing lens module, wherein the collimating lens module is disposed between the image acquiring unit and the dispersion element, the focusing lens module is disposed between the dispersion element and the optical detection element, and a distance between a rear principle point of the collimating lens module and a front principle point of the focusing lens module is defined so as to minimize coma and distortion aberrations.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by the preferred embodiment as described hereinafter.

Figure 2:
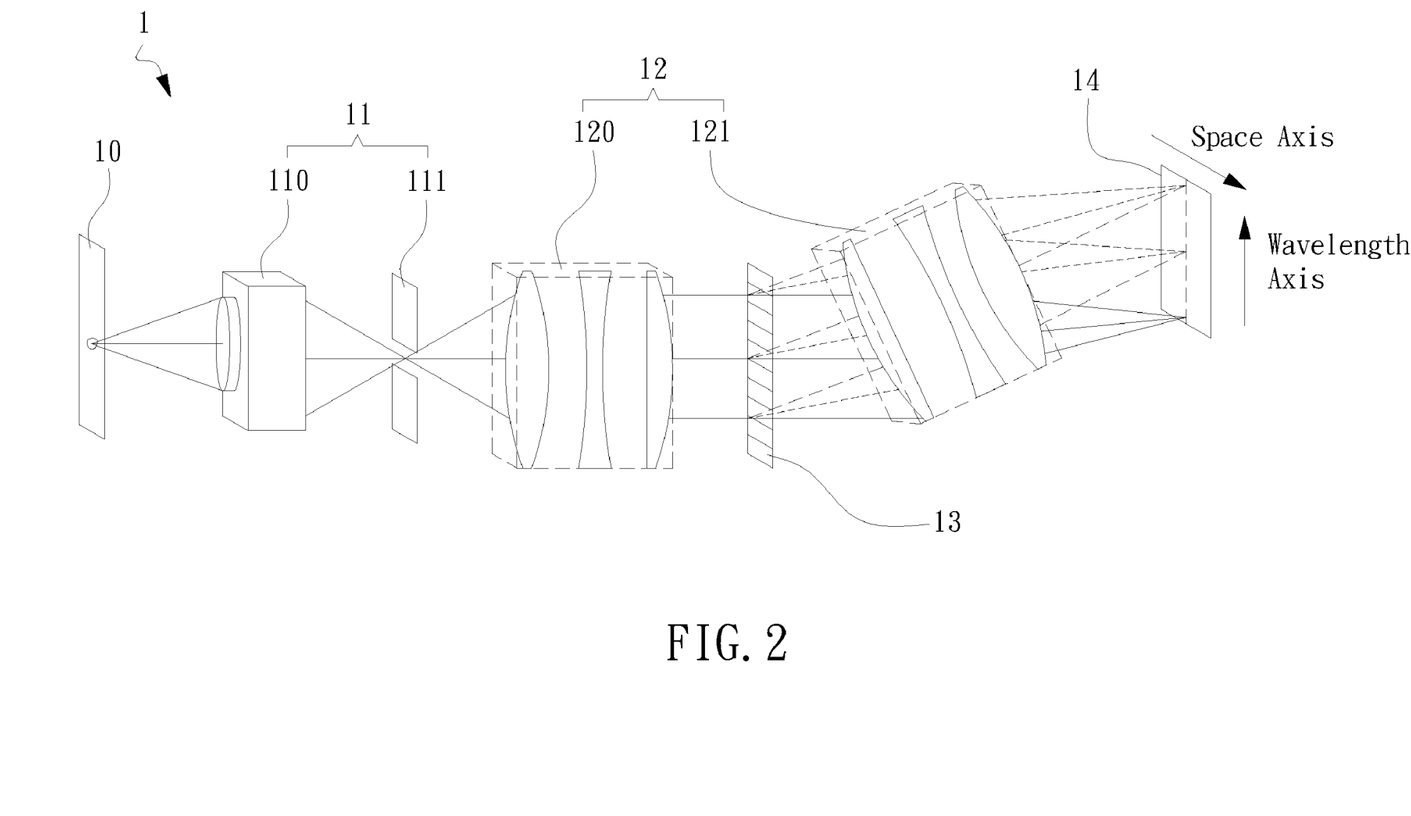
FIG. 2 is a schematic diagram showing a multi-channel imaging spectrometer according to one preferred embodiment of the present invention.

Please refer to FIG. 2, which is a schematic diagram showing a multi-channel imaging spectrometer according to one preferred embodiment of the present invention. The multi-channel imaging spectrometer 1 comprises an image acquiring unit 11, an optical detection element 14, a dispersion element 13 and a lens module 12. The optical detection element 14 is disposed on one side of the image acquiring unit 11. The dispersion element 13 is disposed between the image acquiring unit 11 and the optical detection element 14. The lens module 12 comprises a collimating lens module 120 and a focusing lens module 121. The collimating lens module 120 is disposed between the image acquiring unit 11 and the dispersion element 13. The focusing lens module 121 is disposed between the dispersion element 13 and the optical detection element 14. The image acquiring unit 11 further comprises an image capturing lens 110 and a slit 111. The slit 111 is disposed between the image capturing lens 110 and the collimating lens module 120. The slit 111 is a slender rectangular slit, which is disposed to correspond to an under-test object 10 by way of the image capturing lens 110 so as to create a linear objective under-test field of view. In the present embodiment, the image capturing lens 110 is an image telecentric lens or any imaging lens such as a fiber array probe. The dispersion element 13 is exemplified by but not limited to a transmission diffraction grating or a prism. The optical detection element 14 is a planar array detector such as a charge-coupled device (CCD). On the optical detection element 14 of the multi-channel imaging spectrometer 1, there is formed an imaging distribution on a plane spanned by a space axis and a wavelength axis.

The operation of the multi-channel imaging spectrometer is described hereinafter. The image capturing lens 110 collects a light beam from the under-test object 10. The light beam enters the collimating lens module 120 by way of the slit 111 to become a collimated light beam. The dispersion element 13 splits the collimated light beam into various diffracted light beams with different diffraction angles according to respective wavelengths. The diffracted light beams focus on an imaging plane after passing through the focusing lens module 121. The optical detection element 14 is disposed on the imaging plane so as to detect the energy profiles of the diffracted light beams.

Figure 3A:
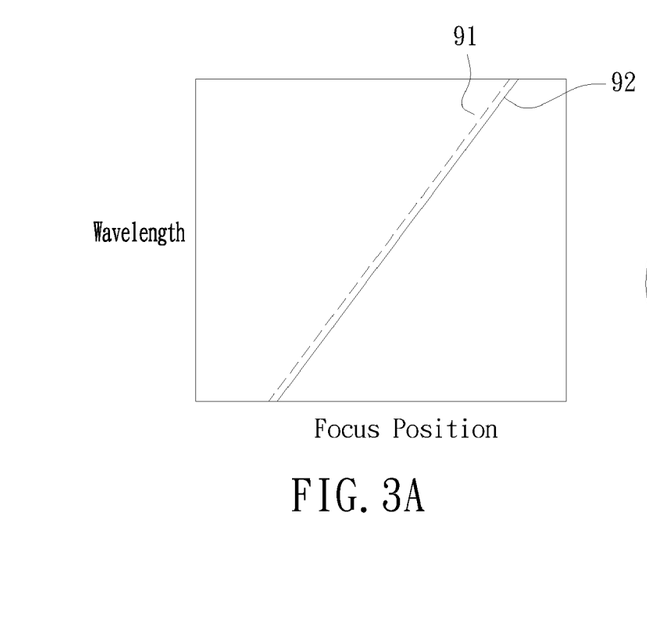
FIG. 3A shows chromatic dispersion of a lens module according to the present invention.
Figure 3B:
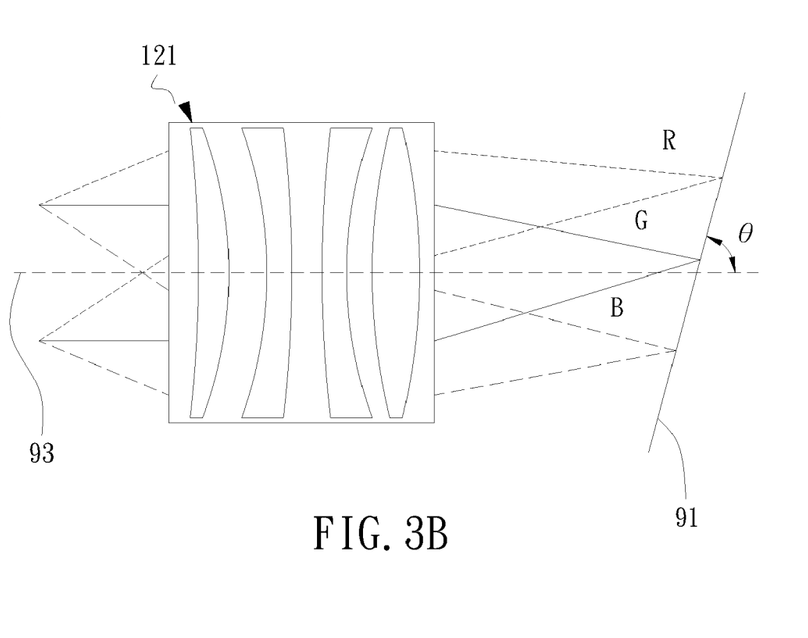
FIG. 3B is a schematic diagram showing an optical detection element according to the present invention.

In order to overcome the chromatic dispersion of the prior art as shown in FIG. 1, the lens module 12 can be used with optical designing software (such as ZEMAX) so that the dispersion characteristics thereof are designed as shown in FIG. 3A. In FIG. 3A, line 92 represents a linear dispersion distribution (a focus plane) of linearly distributed focus points for different wavelengths, wherein 91 indicates the detection surface of the optical detection element 14. The optical detection element 14 has a tilt angle θ relative to the optical axis 93 so that the focus points for light beams with different wavelengths are minimized. The focus points for light beams with different wavelengths on the focus plane 92 are linearly distributed because of the lens module 12. Therefore, with a suitable tilt angle θ of the optical detection element 14, the imaging points for different wavelengths locate on the detection surface 91 for the optical detection element 14. In other words, the tilt angle θ is the angle between the linear dispersion distribution surface 92 and the optical axis 93, as shown in FIG. 3B.

Figure 4A:
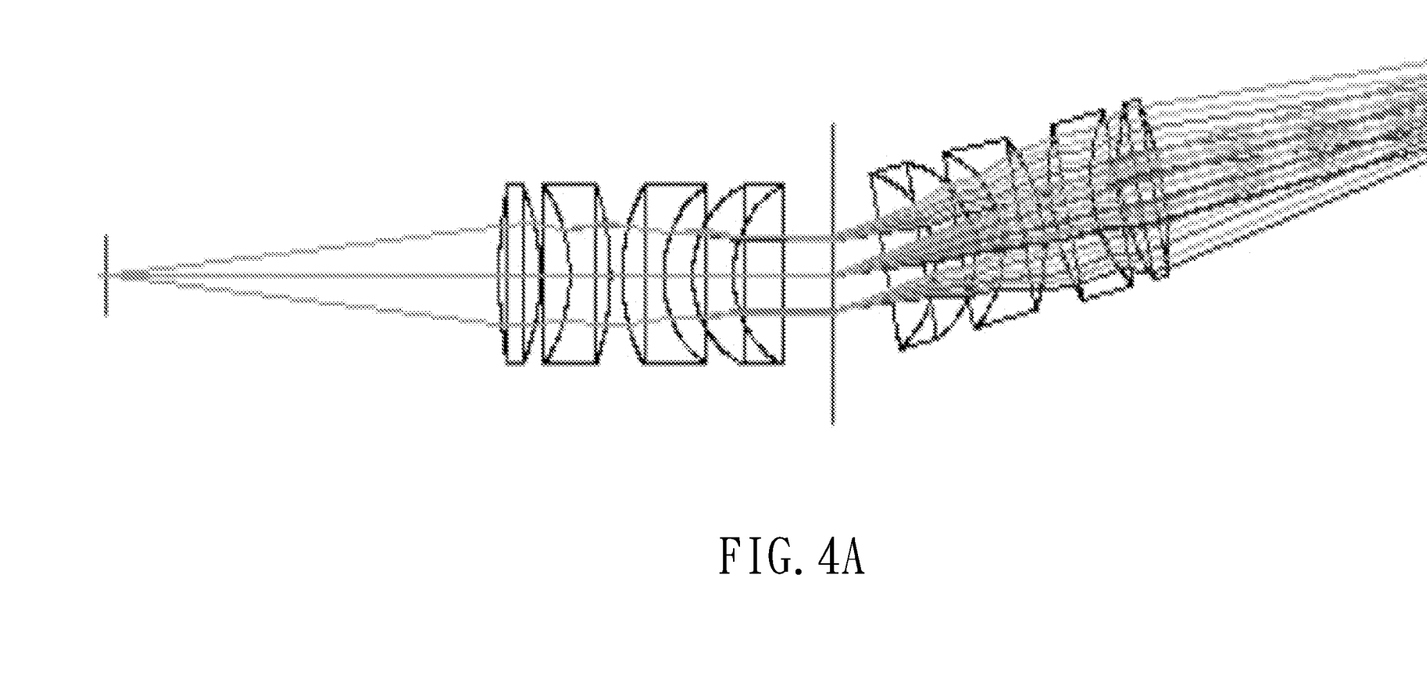
FIG. 4A shows the optical path in the lens module according to the present invention.
Figure 4B:
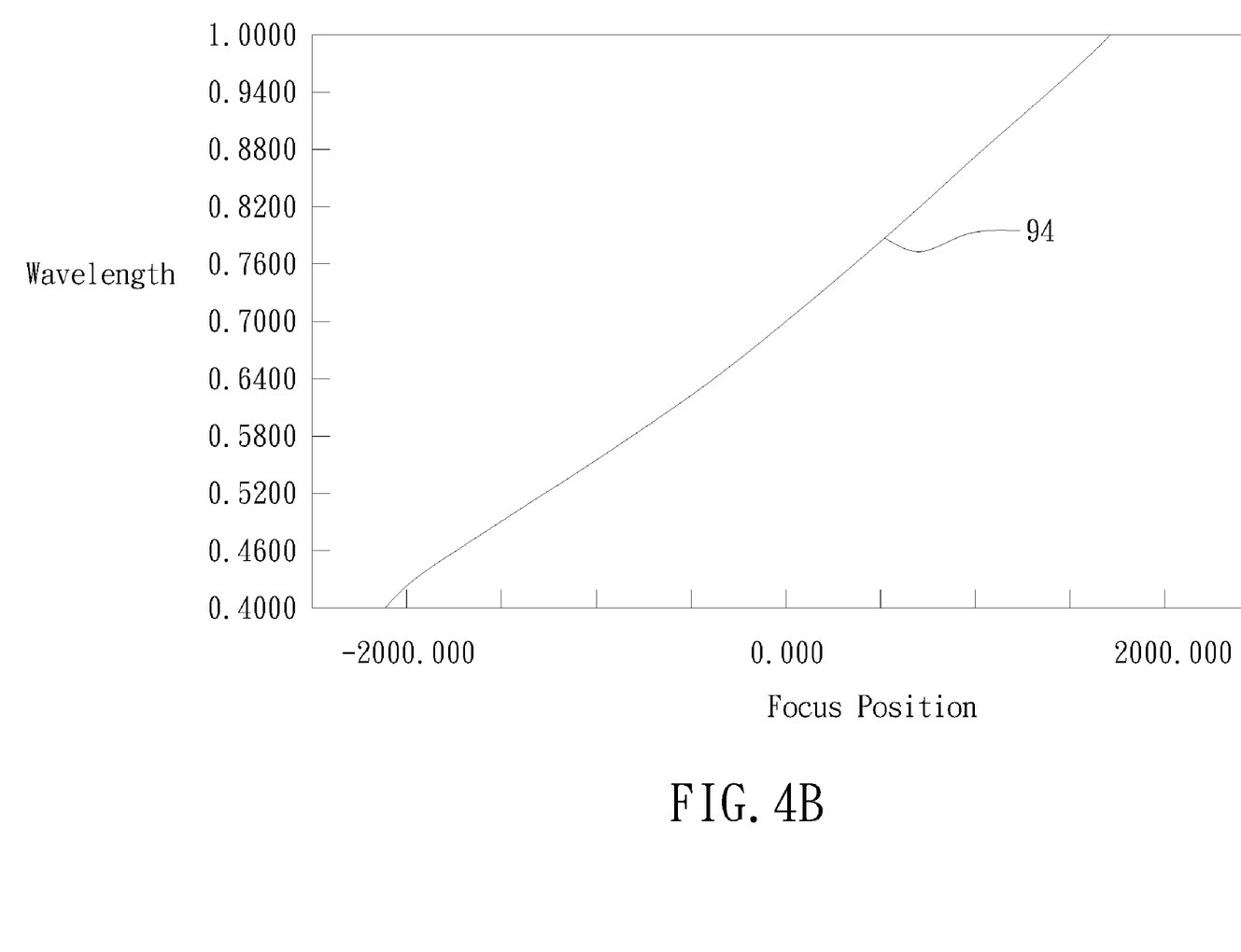
FIG. 4B shows chromatic dispersion of the lens module according to the present invention.

Please refer to FIG. 4A and FIG. 4B, which show respectively the optical path and chromatic dispersion of the lens module according to the present invention. By simulation using ZEMAX, linear dispersion distribution for the lens module is made possible. In FIG. 4B, curve line 94 is the simulated result showing linear dispersion distribution for the lens module.

In the present invention, primary aberrations such as spherical aberration, coma, astigmatism, field curvature and distortion can be minimized by optimizing the design of the collimating lens module and the focusing lens module so as to improve the imaging quality. However, if the above mentioned primary aberrations are to be minimized at the same time, the lens module has be to designed to use more lenses, which is complicated and not a good design. Therefore, in the present invention, a symmetric structure is disclosed to eliminate coma, which corresponds to the spot size of the imaging point, and distortion, which causes distortion of the image with the form of barrel or pincushion on the imaging plane.

Figure 5:
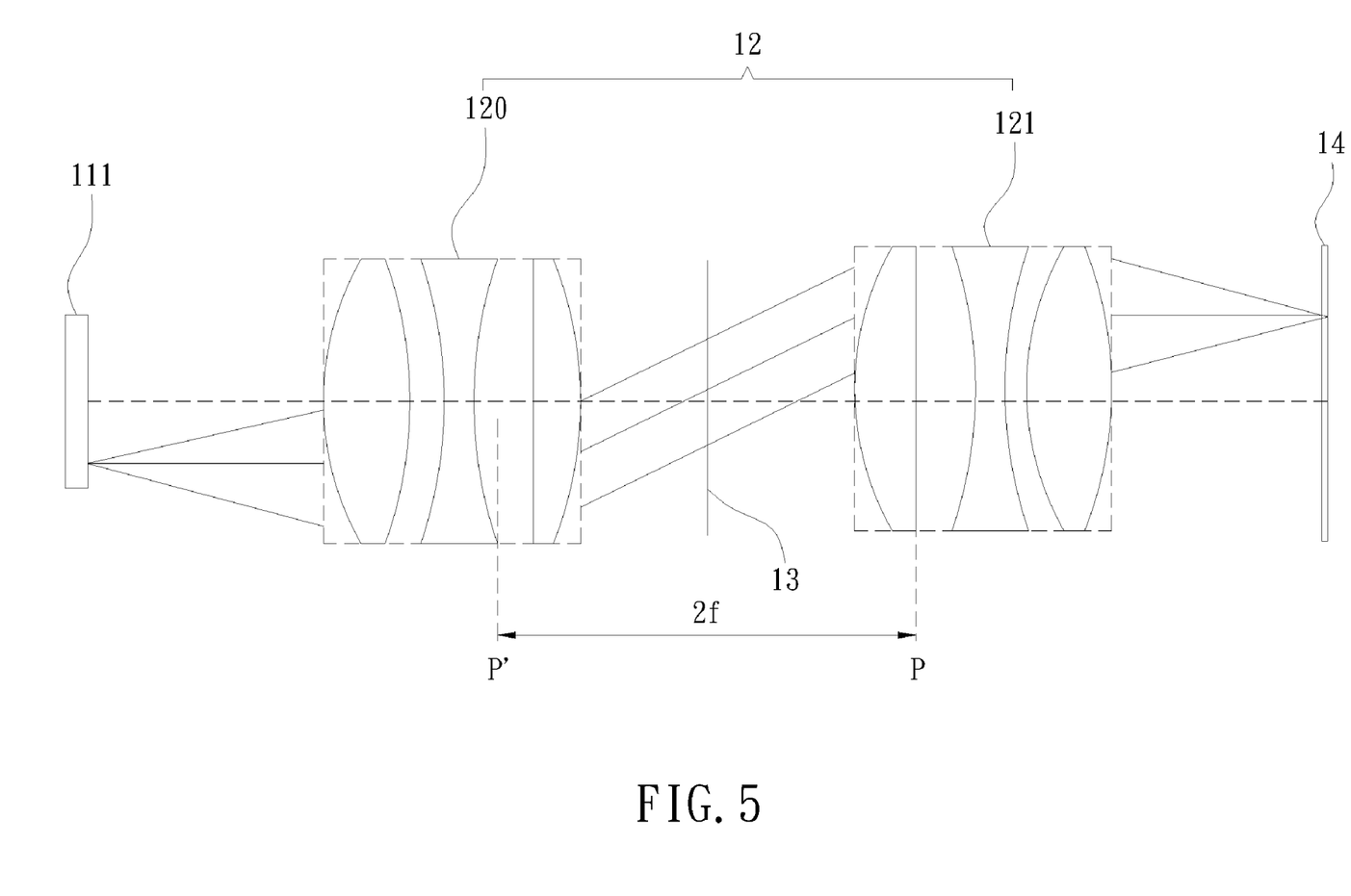
FIG. 5 is a top view of the lens module of the multi-channel imaging spectrometer according to the present invention.

Please refer to FIG. 5, which is a top view of the lens module of the multi-channel imaging spectrometer according to the present invention. The distance between a rear principle point of the collimating lens module and a front principle point of the focusing lens module is adjusted to minimize coma and distortion aberrations. The collimating lens module 120 and the focusing lens module 121 are identical in lens structure. More particularly, the focusing lens module 121 is disposed with opposite direction to the collimating lens. The rear principle point P' of the collimating lens module 120 is separated from the front principle point P of the focusing lens module 121 by a distance that is optimized to be twice of a front focal length of the focusing lens module 121, i.e., 2 f. Therefore, the system is a symmetric telecentric system on both object and image side, which is characterized in that the primary rays of light beams for the object and the image are both parallel with the optic axis so as to eliminate coma and distortion aberrations.

Figure 6A:
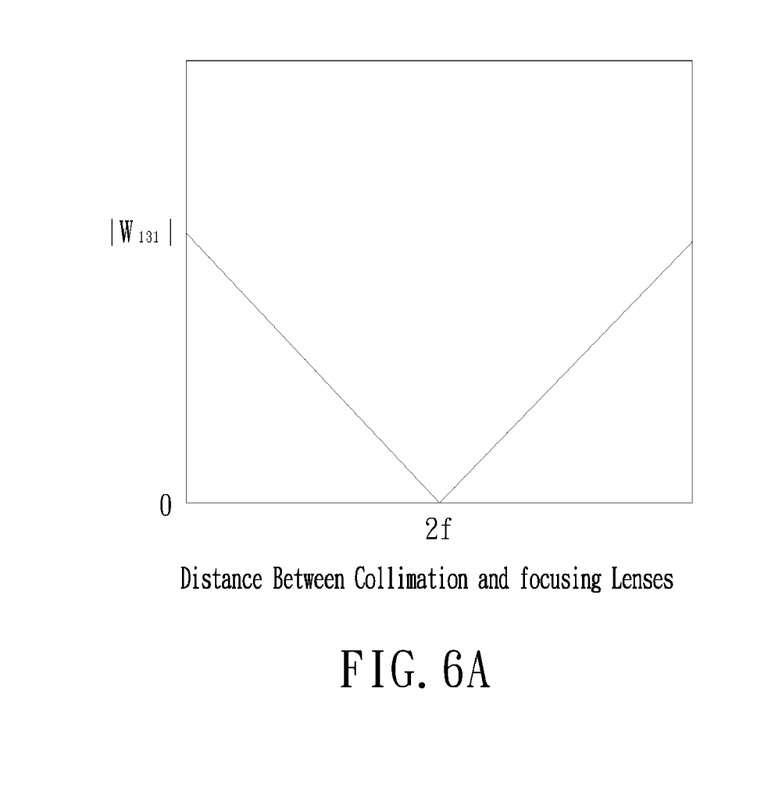
FIG. 6A and FIG. 6B are coma and distortion aberration as a function of the distance between the collimating lens module and the focusing lens module.
Figure 6B:
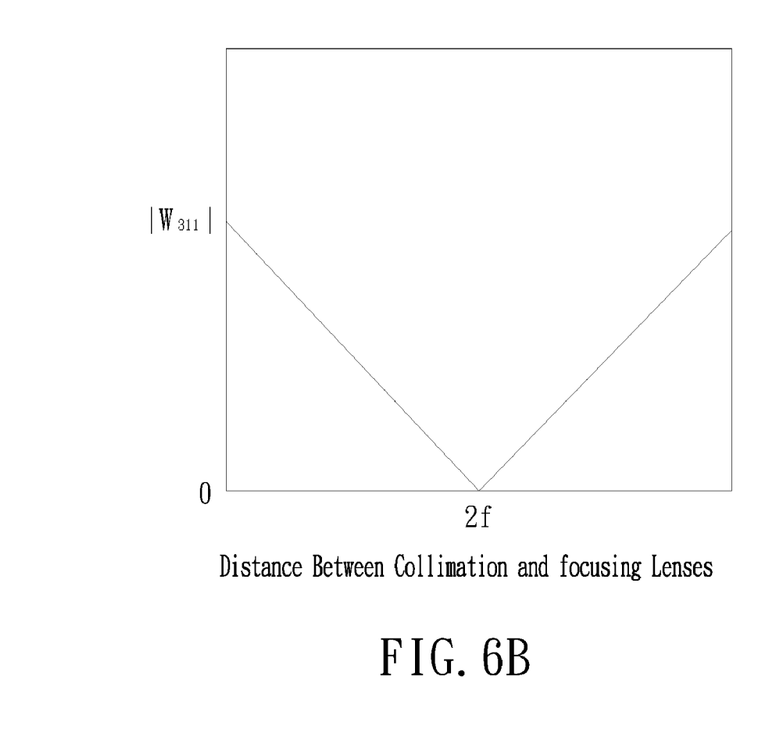

In FIG. 6A and FIG. 6B, coma (W131) and distortion aberration (W311) as a function of the distance between the collimating lens module and the focusing lens module are calculated to verify that the optimized distance is 2 f. Therefore, by using the system disclosed in the present invention, complication of designing the lens module is reduced and only three aberrations are required to be taken in account.

Figure 7:
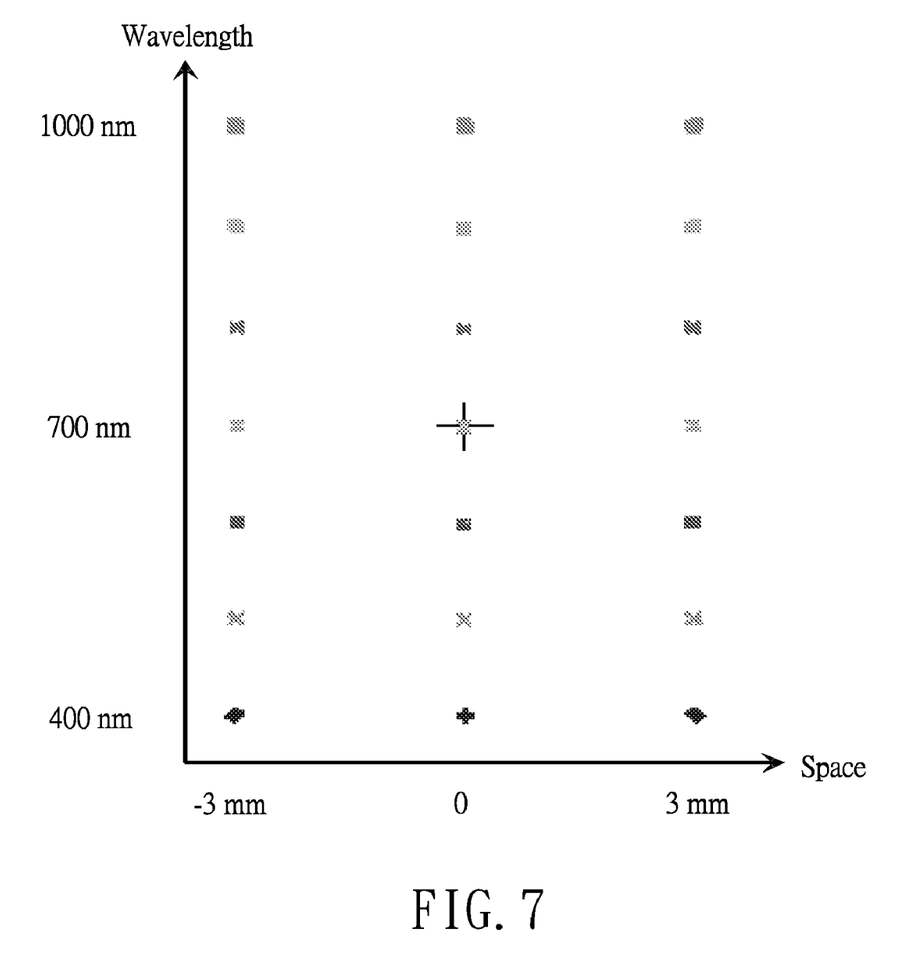
FIG. 7 shows the imaging points of the multi-channel imaging spectrometer according to the preferred embodiment of the present invention.

FIG. 7 shows the imaging points of the multi-channel imaging spectrometer according to the preferred embodiment of the present invention, wherein X is the space axis corresponding to objective linear field of view and Y is the wavelength axis. With the present invention, the spectrum resolution is improved, the focus point distribution on the wavelength axis is uniform and the image bending on the imaging plane caused by the lens module is reduced.

According to the above discussion, it is apparent that the present invention discloses a multi-channel imaging spectrometer for eliminating primary aberrations using the design of a lens module to improve the spectrum resolution and reduce the image distortion. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A multi-channel imaging spectrometer, comprising:
an image acquiring unit;
an optical detection element, disposed on one side of the image acquiring unit;
a dispersion element, disposed between the image acquiring unit and the optical detection element; and
a lens module comprising a collimating lens module and a focusing lens module,
wherein the collimating lens module is disposed between the image acquiring unit and the dispersion element, the focusing lens module is disposed between the dispersion element and the optical detection element, and a dispersion value of the lens module is near-linear distribution so that focus points for different wavelengths locate on the optical detection element.

2. The multi-channel imaging spectrometer as recited in claim 1, wherein the image acquiring unit comprises:
an image capturing lens; and
a slit, disposed between the image capturing lens and the collimating lens module.

3. The multi-channel imaging spectrometer as recited in claim 2, wherein the image capturing lens is an image telecentric lens.

4. The multi-channel imaging spectrometer as recited in claim 2, wherein the image capturing lens is a fiber array probe.

5. The multi-channel imaging spectrometer as recited in claim 1, wherein the dispersion element is a transmission diffraction grating.

6. The multi-channel imaging spectrometer as recited in claim 1, wherein the dispersion element is a prism.

7. The multi-channel imaging spectrometer as recited in claim 1, wherein the optical detection element is a planar array detector.

8. The multi-channel imaging spectrometer as recited in claim 1, wherein the optical detection element has a tilt angle to minimize the focus points for different wavelengths.

9. The multi-channel imaging spectrometer as recited in claim 1, wherein the collimating lens module and the focusing lens module are identical in lens structure.

10. The multi-channel imaging spectrometer as recited in claim 9, wherein a distance between a rear principle point of the collimating lens module and a front principle point of the focusing lens module is twice of a front focal length of the focusing lens module.

11. A multi-channel imaging spectrometer, comprising:
an image acquiring unit;
an optical detection element, disposed on one side of the image acquiring unit;
a dispersion element, disposed between the image acquiring unit and the optical detection element; and
a lens module comprising a collimating lens module and a focusing lens module,
wherein the collimating lens module is disposed between the image acquiring unit and the dispersion element, the focusing lens module is disposed between the dispersion element and the optical detection element, and a distance between a rear principle point of the collimating lens module and a front principle point of the focusing lens module is defined so as to minimize coma and distortion aberrations.

12. The multi-channel imaging spectrometer as recited in claim 11, wherein the image acquiring unit comprises:
an image capturing lens; and
a slit, disposed between the image capturing lens and the collimating lens module.

13. The multi-channel imaging spectrometer as recited in claim 12, wherein the image capturing lens is an image telecentric lens.

14. The multi-channel imaging spectrometer as recited in claim 12, wherein the image capturing lens is a fiber array probe.

15. The multi-channel imaging spectrometer as recited in claim 11, wherein the dispersion element is a transmission diffraction grating.

16. The multi-channel imaging spectrometer as recited in claim 11, wherein the dispersion element is a prism.

17. The multi-channel imaging spectrometer as recited in claim 11, wherein the optical detection element is a planar array detector.

18. The multi-channel imaging spectrometer as recited in claim 11, wherein the optical detection element has a tilt angle to minimize focus points for different wavelengths.

19. The multi-channel imaging spectrometer as recited in claim 11, wherein the collimating lens module and the focusing lens module are identical in lens structure.

20. The multi-channel imaging spectrometer as recited in claim 19, wherein the distance between the rear principle point of the collimating lens module and the front principle point of the focusing lens module is twice of the front focal length of the focusing lens module.

* * * * *